Dec. 12, 1939.  K. N. OGLE  2,183,028
TRIAL LENS
Filed March 7, 1936  2 Sheets-Sheet 1

Inventor:
Kenneth N. Ogle,
by Roberts, Cushman & Woodbury
Attys.

Dec. 12, 1939.  K. N. OGLE  2,183,028
TRIAL LENS
Filed March 7, 1936  2 Sheets-Sheet 2
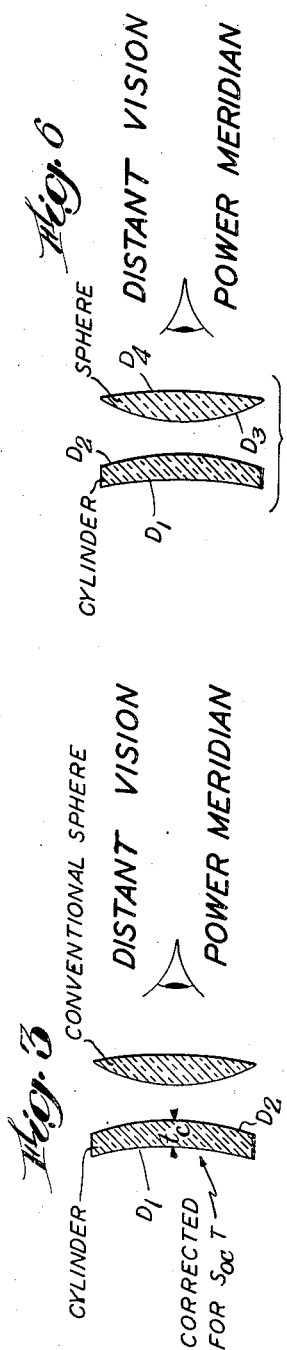
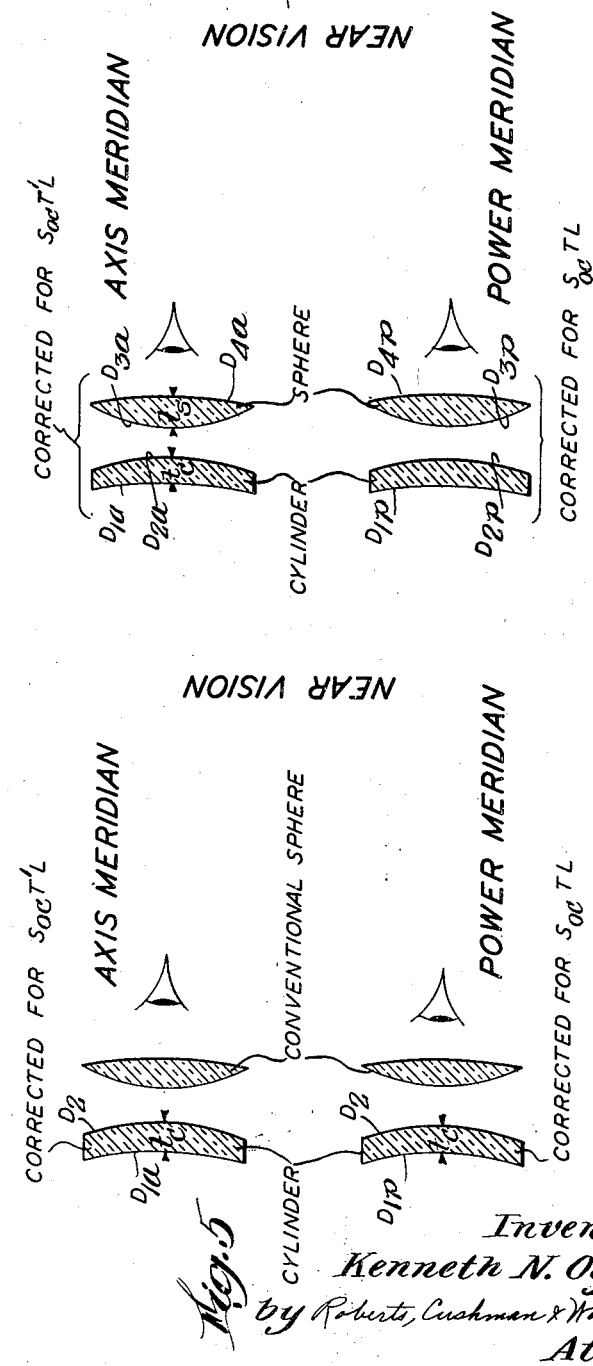
Inventor,
Kenneth N. Ogle,
by Roberts, Cushman & Woodberry
Attys.

Patented Dec. 12, 1939

2,183,028

UNITED STATES PATENT OFFICE 2,183,028

TRIAL LENS

Kenneth N. Ogle, Hanover, N. H., assignor to trustees of Dartmouth College, Hanover, N. H., a corporation of New Hampshire Application March 7, 1936, Serial No. 67,665

5 Claims. (Cl. 88—20)

The present invention deals with the correction of ocular defects involving not merely the dioptric or power conditions of the eyes, that is, distances between objects and images, but also incongruities of the respective patterns of the ocular images of a pair of eyes during binocular vision. The term ocular image as herein used describes the impression formed in the higher brain centers through the vision of one eye, which impression is determined not only by the properties of the dioptric image that is formed in the eye, but also by the modifications imposed thereupon by the anatomical properties and physiological processes by which this optical image is formed and carried to the higher brain centers.

More particularly, the invention deals with lenses and lens sets which permit the accurate and convenient determination and correction of the dioptric or power properties of an eye and which have characteristics making them especially suited for use in cases where the above-mentioned ocular image incongruities have to be taken into consideration.

It is one of the main objects of the invention to provide combinations of lens elements, as for example spherical and cylindrical trial lenses, producing a certain dioptric effect but avoiding dimensional image changes inherently effected by heretofore known lens combinations of this type. In one of its aspects, the invention contemplates lens combinations consisting of spherical and cylindrical elements which are constructed to eliminate a dimensional image change due to the different spacing from the eye of the two lens elements. In another aspect, the invention deals with trial power lens sets which indicate the dioptric defect of an eye in a manner permitting the determination of spectacles correcting dioptric as well as image incongruity defects according to a simple method, by inherently eliminating undesirable dimensional image changes which would have to be especially compensated if said method were based on tests with dioptric trial lenses of the conventional type.

Figure 1:
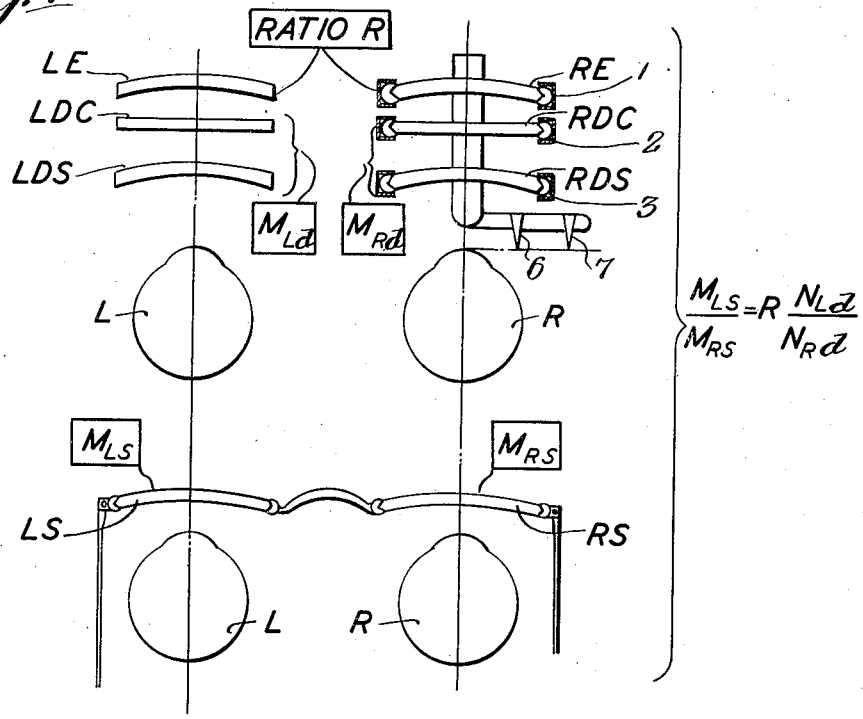
Figure 2:
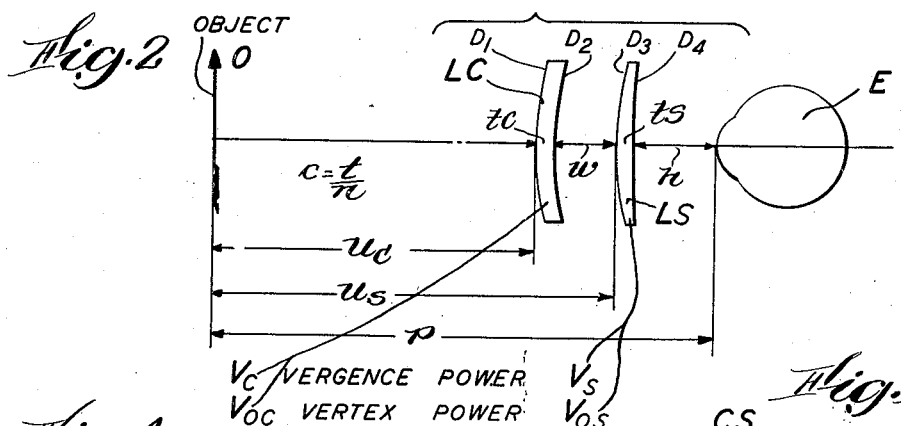
Figure 1A:
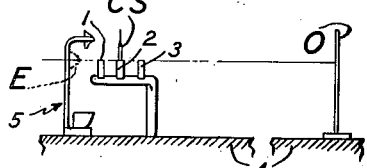

This and other objects, aspects and features of the invention will be apparent from the following detailed explanation illustrating its genus with reference to several embodiments thereof. The description refers to drawings in which:

Fig. 1 indicates the dioptric and eikonic correction of a pair of eyes with trial lenses and equivalent spectacles;

Fig. 1a indicates the testing of eyes for dioptric and eikonic defects;

Fig. 2 is a diagram indicating the optical data of a two lens system before an eye; and Figs. 3 to 7 show lens combinations from trial lens sets according to the present invention.

In order to gain an understanding of the problem of which the present invention presents a solution, and of that solution itself, it will be necessary to give a short outline of the determination and correction of dioptric and ocular image incongruity defects, as follows:

Referring to Fig. 1, the eyes L and R are tested with so-called eikonic lenses which correct all types of ocular image incongruities without substantially affecting the dioptric conditions of the eyes. Since the present invention is not particularly concerned with the details of such corrections, these test means are indicated by only a single eikonic lens, LE and RE respectively, for each eye.

The dioptric defects are corrected by means of spherical trial lenses LDS, RDS, and cylindrical lenses RDC, LDC in front thereof.

These lenses are placed in suitable means defining a predetermined distance between trial correction lenses and eyes. Such means are, for example, described in Patent No. 2,095,235, of October 12, 1937, to Adelbert Ames, Jr., and herein indicated by lens holders 1, 2, 3 (Fig. 1a) mounted on a support 4 suitably connected with a head rest 5 and sights 6, 7 (Fig. 1) for positioning the corneas in proper relation to the lens holders and test object O. It will be evident that other means may be used for the same purpose, as for example the customary adjustable trial lens frames.

It is obviously very convenient to be able to determine the combined effect of spheric and cylindrical trial lenses by merely adding powers marked on each particular lens.

As discussed in my Patent No. 2,131,232, of September 27, 1938, the total vergence power for any given object distance is $$V_t = V_{os} + \frac{V_c S^2_{os}}{1 - V_c(w + S_{oc}c_s)} \quad (1)$$

where $$V_c = V_{oc} - \frac{S^2_{oc}}{u_c + S_{oc}c_c} \quad (2)$$

In these expressions, $V_t$ is the total vergence power effected by both lenses together, $V_{os}$ and $V_{oc}$ are the vertex powers of sphere and cylinder, respectively, and $V_c$ is the vergence power of the cylinder for the given object distance $u$ from the anterior surface. These values, as well as distance $u_c$, the separation $w$ of sphere and cylinder, $c_s$ and $c_c$, the reduced thicknesses or ratios of actual thickness $t$ and index of refraction $n$, of sphere and cylinder respectively and object distance $p$, are indicated in Fig. 2.

It should be noted that, for finite object distance, power effects referred to the ocular lens surface are defined as the reciprocal of the image distance from that surface and herein termed vergence powers. For infinite object distance, vergence powers become vertex powers or back focal powers, herein distinguished by subscript $o$.

$S_{os}$ and $S_{oc}$ are the shape magnification factors explained in the above patent and depend upon the meniscus shape, cupping or dishing of the lenses.

For infinite object distance, Formula 1 becomes $$V_{ot} = V_{os} + \frac{V_{oc} S^2_{os}}{1 - V_{oc}(w + S_{oc} c_s)} \quad (3)$$

It will be evident that the marked powers of the two trial lenses will add up to the total power, for infinite object distance, if the spheres are marked with their $V_{os}$ values and the cylinders as having a power $V'_{oc}$ defined as follows:

$$V'_{oc} = \frac{V_{oc} S^2_{os}}{1 - V_{oc}(w + S_{os} c_s)} \quad (4)$$

This provides, for distant vision, the required additive relation $$V_{ot} = V'_{oc} + V_{os} \quad (5)$$

Formula 4 indicates that the lenses of such sets must be designed in such a way that $V'_{oc}$ is a function only of $V_{oc}$. In other words, all spheres must have the same $S_{os}$ and $c_s$, and that $w$ must be constant. This means that all spheres must have the same front surface power and thicknesses, and that the axial separation of the test lens pairs must be constant.

Several of the trial case sets commercially available today are of this type.

It will now be apparent that the total power obtained by adding the marked powers of the trial lenses is strictly correct only for infinite distance. For tests at near (as reading) distance, these values must be corrected; however, this compensation is immaterial as far as the present invention is concerned and therefore not discussed herein.

After the proper eikonic and dioptric test lenses have been determined, the problem is to design spectacle lenses LS, RS which are substantially equivalent to these trial lenses with respect to power as well as magnification properties. Since the present invention is mainly concerned with magnification properties, only the magnification equivalency will be discussed.

The eikonic test lenses LE, RE determine in any given element of the visual field an eikonic correction ratio R. For any such element, the condition of equivalency, as far as dimensional image incongruities are concerned, is then $$\frac{M_{Ls}}{M_{Rs}} = R \frac{M_{Ld}}{M_{Rd}} \quad (6)$$

where $M_{Ls}$, $M_{Rs}$ are the magnifications of spectacle lenses $L_s$ and $L_R$ respectively, and $M_{Ld}$, $M_{Rd}$ the magnifications of the dioptric test lenses LDS, LDC and RDS, RDC, respectively.

As explained at length in the above-mentioned Patent No. 2,131,232,—compare Formulas 13 and 3 of that patent,—the magnification of a two element lens system can be expressed as $$M = S_{os} S_{oc} TLP \quad (7)$$

where subscripts $c$ and $s$ of the "shape magnification" values indicate in the present instance that the cylindrical and spherical trial lenses represent the first and second lens elements, respectively, of the two element system.

It is therefore evident that, in order to determine the correct magnifications for the spectacle lenses, the magnifications introduced by the dioptric trial lenses must be carefully considered.

As likewise described in the above-identified patent, the power factor P disappears because duplicated in the spectacle, and shape factor $S_{os}$ disappears if a dioptric trial set of the customary type is used, that is a set where all spheres have the same thickness, all cylinders have the same thickness, all spheres have the same front surfaces, all cylinders have the same front surfaces, and where the separation between all spheres and cylinders is constant. Formula 6 becomes then $$\frac{M_{Ls}}{M_{Rs}} = R \frac{N_{Ld}}{N_{Rd}} \quad (8)$$

The value N is referred to as "spurious magnification" or "cylindrical excess magnification," and its factors $S_{oc}$, T and L are defined as follows by the previously mentioned values indicated in Fig. 2:

$$S_{oc} = \frac{1}{1 - D_1 c_c} \quad (9)$$

$$T = \frac{1}{1 - V_c(w + S_{oc} c_s)} \quad (10)$$

$$L = \frac{p}{u_c + S_{oc} c_c} \quad (11)$$

The shape factor $S_{oc}$ could be neglected, as cancelling out from Equation 8, if cylinders were always used before both eyes, again assuming that a conventional trial set with equal front surface power and lens thicknesses is used. Since, however, this condition is not normally fulfilled, this factor must be taken into consideration.

In the separation factor T, values $w$, $S_{os}$ and $c_s$ are constants if the conventional trial set is used; hence T varies ordinarily only with the vergence power $V_c$ of the cylinder lens used. For distant vision tests, $V_c$ changes into vertex power $V_{oc}$ which is zero in the axis meridian. Hence, the T factor is unity in that axis for distant vision. It is always present in the power meridian of the cylinder trial lens, and in addition in the axis meridian when the object distance is finite.

The distance factor L is effective in the power and axis meridians, unless the test is made for infinite distance, when L is unity. If cylinder lenses are used before both eyes, L is the same for both eyes and cancels out. It will, therefore, be evident that factor L must always be considered in tests for near vision when only one cylinder is used, which is quite frequently the case.

Summing up, the cylinder trial lens in front of the trial sphere introduces, for near vision, an excess magnification $S_{oc}TL$ in the power and axis meridians; for distant vision, an excess magnification $S_{oc}T$ is introduced in the power meridian. The following Table I gives excess magnification values of certain cylinder elements of a conventional trial set. It will be noted that these values may be of magnitudes likely to change ocular image relations to a considerable degree.

TABLE I

*Per cent spurious magnification values of a conventional trial lens set*

| Cylinder power diopters | Near vision | | Distant vision | |
|---|---|---|---|---|
| | Power meridian | Axis meridian | Power meridian | Axis meridian |
| −1 | −.23 | +.13 | −.34 | .00 |
| −2 | −.57 | +.13 | −.67 | .00 |
| −3 | −.92 | +.13 | −1.00 | .00 |
| −4 | −1.28 | +.13 | −1.30 | .00 |

While the above-identified patent provides ways for compensating the spurious magnification introduced by the conventional trial set, it is desirable to have test lenses which are inherently free of this effect and therefore simplify the computation of spectacle lenses which are equivalent to a given test correction comprising cylindrical power trial lenses.

Trial sets according to my invention, which are inherently compensated for spurious magnification will now be described.

In order to obtain a corrected trial set for far vision tests, I reduce, according to the present invention, value $S_{oc}T$ to unity by putting, from Formulas 9 and 10, $$S_{oc}T = \frac{S_{oc}}{1 - V_{oc}(w + S_{os}c_s)} = 1 \tag{12}$$

This condition implies that a change can be made in the shape magnification factor $S_{oc}$ of the trial case cylinders which will counterbalance the power spurious magnification T.

The front surface power $D_1$ of cylinder lenses having the above characteristics can be found by substituting in Equation 12 the value for $V_{oc}$ from Equation 4 and the value for $S_{oc}$ from Equation 9 and solving for $D_1$ as follows:

$$D_1 = -\frac{V'_{oc}}{c_c}\left[\frac{w + S_{os}c_s}{S^2_{os}}\right] \tag{13}$$

Table II gives all data for a set of cylinder lenses of this type, for steps of one diopter, to be used with the conventional trial set spheres, as above described.

TABLE II

*Corrected power meridians of cylinder lenses to be used with standard trial set spheres*

Distant vision ($u = -6$ m.)
$w = 2.3$ mm.
Plano curves in the axis meridian

| Effective power, diopters | $D_1$ diopters | $t_c$ mm. | $D_2$ diopters | $V_{oc}$ diopters |
|---|---|---|---|---|
| 4 | −11.26 | 1.90 | 15.00 | 3.90 |
| 3 | −8.45 | 1.90 | 11.29 | 2.93 |
| 2 | −5.63 | 1.90 | 7.55 | 1.96 |
| 1 | −2.81 | 1.90 | 3.79 | 0.98 |
| 0 | | | | |
| −1 | 3.82 | 1.40 | −4.82 | −0.99 |
| −2 | 7.64 | 1.40 | −9.88 | −1.99 |
| −3 | 11.46 | 1.40 | −14.58 | −2.99 |
| −4 | 15.28 | 1.40 | −19.50 | −4.01 |

One lens combination taken from a trial set of this type is shown in Fig. 3, in section through the power meridian.

If the curves in the axis or no-power meridians are made with no power, these cylinder lenses will have to be double torics; it is however feasible to provide them with spherical front surfaces and to compensate the resulting magnification change with zero power spheres of the same front surface curvature and thickness, placed before the other eye, unless a cylinder of the same type is used before that eye, in which case the two front surface spheres would compensate each other.

Referring to Formula 7 and considering that $$P = \frac{1}{1 - V_{ot}h} \tag{14}$$

the total magnification of any combination of cylinder and sphere, under the conditions stated, will then be $$M = \frac{S_{os}}{1 - V_{ot}h} \tag{15}$$

and the total power $$V_{ot} = V_{os} + V'_{oc} \tag{16}$$

Considering now near vision, the conventional set has for finite object distance, as pointed out above, an excess magnification comprising factors T and L in both power and axis meridians. Hence, a second set of cylinder lenses compensated for excess magnification is desirable for exact measurements at that distance which is corrected for TL in both power and axis meridians.

Figure 4:
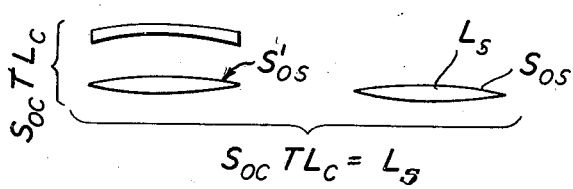

According to the present invention, trial lens sets of this type may be so designed that the total spurious magnification of the combination consisting of cylinder and sphere is in a certain meridian equivalent to the distance magnification factor in the corresponding meridian of the sphere of that combination. These distance magnification factors of spheres, indicated as $L_s$ in Fig. 4, vary with the shape of the sphere and its distance from the object and disappear from the R ratio, Formulas 6 and 7, if only spheres are used before both eyes, and also if both cylinders and spheres are used before both eyes. However, they must be considered if only one cylinder is used. If the spurious magnification of any cylinder-sphere combination is made equal to the $L_s$ factor of the sphere before the other eye, as indicated in Fig. 4, any possible test lens correction will be compensated for spurious magnification.

The $L_s$ factor is given by the formula $$L_s = \frac{S^2_{os}}{u_s + S_{os}} \tag{17}$$

where $S_{os}$ is again the shape magnification of the sphere, and $u_s$ is the distance from object to anterior sphere surface, as shown in Fig. 2.

Referring first to the power meridian, the spurious magnification of the cylinder-sphere combination will accordingly be compensated when the following relation is fulfilled:

$$S_{oc}TL_c = L_s \tag{18}$$

Substituting the values of Formulas 9, 11, and 17 into Equation 18, the following quadratic relation is obtained:

$$S^2_{oc}b + S_{oc}[c_c(1 - V_{oc}b) - (u_s + S_{os}c_s)] + u_c(1 - V_{oc}b) = 0 \tag{19}$$

In this relation, $b = w + S_{os}c_s$.

If Equation 19 is solved for $S_{oc}$, the $D_1$ values can be found from Relation 9 as $$D_{1p} = \frac{1}{c_c}\left[\frac{S_{oc}-1}{S_{oc}}\right] \quad (20)$$

In the axis meridian, the spurious magnification is likewise compensated by making it equal to the distance magnification factor of the sphere, according to the relation $$S_{oc}T'L_c = L_s \quad (21)$$

Factor $T'$ is different from the $T$ factor for the power meridian and dependent upon the vergence power of the cylinder which is in this instance, because the image and object planes coincide, $$V'_c = \frac{1}{u_s - w} \quad (22)$$

The ocular cylinder surface can then be found by means of single lens relation $D_2 = V - SF_1$, where $F_1$ is the vergence with which the incident rays leave surface $D_1$.

Designing the cylinders in this manner reduces the eikonic condition, Equation 8 to $$\frac{M_{Ls}}{M_{Rs}} = R$$

since the N factors vanish.

Thus, the ocular image incongruity as clinically measured acquires significant meaning, and indicates directly and accurately the conditions to be met in the design of the equivalent spectacle lenses.

Table III specifies a set of cylinder lenses according to the invention, for near vision, analogous to the set given in Table II.

TABLE III

*Corrected power and axis meridians of cylinder lenses to be used with standard trial set spheres*

Near vision ($u = 40$ cm.); $w = 2.3$ mm.

| Effective power diopters | $D_1$ diopters | | $t_c$ mm. | $D_2$ diopters | |
|---|---|---|---|---|---|
| | Axis meridian | Power meridian | | Axis meridian | Power meridian |
| 4 | −1.41 | −12.72 | 1.9 | +1.40 | +16.42 |
| 3 | −1.41 | −9.82 | 1.9 | +1.40 | +12.63 |
| 2 | −1.41 | −6.92 | 1.9 | +1.40 | +8.84 |
| 1 | −1.41 | −4.19 | 1.9 | +1.40 | +5.15 |
| 0 | | | | | |
| −1 | −1.40 | +2.44 | 1.4 | +1.39 | −3.44 |
| −2 | −1.40 | +6.39 | 1.4 | +1.39 | −8.42 |
| −3 | −1.40 | +10.31 | 1.4 | +1.39 | −13.40 |
| −4 | −1.40 | +14.05 | 1.4 | +1.39 | −18.24 |

Fig. 5 shows a set of lenses taken from a trial lens set for near vision, according to the present invention, sectioned on axis and power meridians, respectively.

It will be noted that the design of lenses for distant vision tests may be derived from the relations for near vision, since $L_s$ becomes unity for infinite object distance.

According to another modification of the present invention, I do not combine redesigned cylinders with conventional spheres, but provide both cylinders and spheres of novel design. This modification is especially valuable if it is desired to avoid the rather high negative front curves of the positive cylinders as given in Table III.

Relation (16) for $D_1$ shows that the front surface curves of the cylinders can be reduced by diminishing values $S_{os}$, $c_s$ and $w$, or by increasing $c_c$.

A complete trial set derived in this manner from sets of Tables II and III is given in Tables IV and V as follows:

TABLE IV

*Corrected cylindrical and spherical trial set lenses*

Distant vision; $w = 1.5$ mm.

CYLINDERS

| Effective power diopters | $D_1$ diopters | $t_c$ mm. | $D_2$ diopters | $V_{oo}$ diopters |
|---|---|---|---|---|
| 4.0 | −8.57 | 2.0 | +12.43 | +3.96 |
| 3.0 | −6.43 | 2.0 | +9.35 | +2.97 |
| 2.0 | −4.28 | 2.0 | +6.25 | +1.99 |
| 1.0 | −2.14 | 2.0 | +3.13 | +1.00 |
| −1.0 | +2.14 | 2.0 | −3.15 | −1.00 |
| −2.0 | +4.28 | 2.0 | −6.32 | −2.01 |
| −3.0 | +6.43 | 2.0 | −9.51 | −3.03 |
| −4.0 | +8.57 | 2.0 | −12.71 | −4.05 |

SPHERES

| Effective power diopters | $D_3$ diopters | $t_s$ mm. | $D_4$ diopters |
|---|---|---|---|
| 4.0 | Plano | 2.0 | 4.0 |
| 3.0 | do | 2.0 | 3.0 |
| 2.0 | do | 2.0 | 2.0 |
| 1.0 | do | 2.0 | 1.0 |
| −1.0 | do | 2.0 | −1.0 |
| −2.0 | do | 2.0 | −2.0 |
| −3.0 | do | 2.0 | −3.0 |
| −4.0 | do | 2.0 | −4.0 |

TABLE V

*Corrected meridians of cylindrical and spherical trial set lenses*

Near vision; $w = 1.5$ mm.

CYLINDERS

| Effective power diopters | $D_1$ diopters | | $t_c$ mm. | $D_2$ diopters | |
|---|---|---|---|---|---|
| | Axis meridian | Power meridian | | Axis meridian | Power meridian |
| 4.0 | −1.37 | −9.93 | 2.0 | +1.37 | +13.76 |
| 3.0 | −1.37 | −7.75 | 2.0 | +1.37 | +10.69 |
| 2.0 | −1.37 | −5.60 | 2.0 | +1.37 | +7.50 |
| 1.0 | −1.37 | −3.42 | 2.0 | +1.37 | +4.31 |
| −1.0 | −1.37 | +0.90 | 2.0 | +1.37 | −2.00 |
| −2.0 | −1.37 | +3.05 | 2.0 | +1.37 | −5.20 |
| −3.0 | −1.37 | +5.25 | 2.0 | +1.37 | −8.40 |
| −4.0 | −1.37 | +7.35 | 2.0 | +1.37 | −11.47 |

SPHERES

| Effective power diopters | $D_3$ diopters | $t_s$ mm. | $D_4$ diopters |
|---|---|---|---|
| 4.0 | Plano | 2.0 | 4.0 |
| 3.0 | do | 2.0 | 3.0 |
| 2.0 | do | 2.0 | 2.0 |
| 1.0 | do | 2.0 | 1.0 |
| −1.0 | do | 2.0 | −1.0 |
| −2.0 | do | 2.0 | −2.0 |
| −3.0 | do | 2.0 | −3.0 |
| −4.0 | do | 2.0 | −4.0 |

Figs. 6 and 7 illustrate lens combinations taken from Tables IV and V, respectively. These figures are similar to Figs. 3 and 5 with the exception that both cylinders and spheres are redesigned.

Instead of substantially eliminating the cylindrical excess magnification, it may sometimes be convenient to control it, according to another modification of the present invention, by determining it in a manner which simplifies its compensation when computing the equivalent spectacle lenses. For example, instead of making value $S_{oc}T$ unity according to Formula 12, it can be reduced to values in convenient steps of for example 0.50% magnification by putting $S_{oc}T$ equal to 1.005, 1.010, etc. A set of this type is identified in Table VI.

Table VI

Corrected trial set cylinders with stepped excess magnification

Distant vision; $w=2.3$ mm.

| Effective power diopters | Cylindrical excess magnification | $D_1$ diopters | $t$ mm. | $D_2$ diopters |
|---|---|---|---|---|
| | Percent | | | |
| +4.0 | 1.0 | −3.21 | 1.9 | +7.10 |
| +3.0 | 1.0 | −0.43 | 1.9 | +3.36 |
| +2.0 | 0.5 | −1.61 | 1.9 | +3.57 |
| +1.0 | 0.5 | +1.19 | 1.9 | −0.21 |
| −1.0 | 0.5 | +9.21 | 1.4 | −10.18 |
| −2.0 | 0.5 | +13.09 | 1.4 | −15.24 |
| −3.0 | 1.0 | +22.12 | 1.4 | −25.57 |
| −4.0 | 1.0 | +25.90 | 1.4 | −30.54 |

These are to be used with standard trial case lenses. (Spheres.)

For near vision, Relations 18 and 21, respectively, will be modified to make values $S_{oc}TL_c$ and $S_{oc}T^1L_c$, respectively, not equal to $L_s$, but to suitable multiples of $L_s$, as 1.005 $L_s$, 1.010 $L_s$ etc. A lens set of this type is given in Table VII.

Table VII

Corrected trial set cylinders with stepped excess magnification

Near vision; $w=2.3$ mm.

| Effective power diopters | Cylindrical excess magnification | $D_1$ diopters | | $t$ mm. | $D_2$ diopters | |
|---|---|---|---|---|---|---|
| | | Axis meridian | Power meridian | | Axis meridian | Power meridian |
| | Percent | | | | | |
| +4.0 | 1.0 | −1.41 | −4.66 | 1.9 | +1.40 | +8.53 |
| +3.0 | 1.0 | −1.41 | −1.78 | 1.9 | +1.40 | +4.71 |
| +2.0 | 0.5 | −1.41 | −2.92 | 1.9 | +1.40 | +4.87 |
| +1.0 | 0.5 | −1.41 | −0.18 | 1.9 | +1.40 | +1.16 |
| −1.0 | 0.5 | −1.40 | +7.84 | 1.4 | +1.39 | −8.89 |
| −2.0 | 0.5 | −1.40 | +11.77 | 1.4 | +1.39 | −13.89 |
| −3.0 | 1.0 | −1.40 | +20.98 | 1.4 | +1.39 | −24.38 |
| −4.0 | 1.0 | −1.40 | +24.68 | 1.4 | +1.39 | −29.27 |

These are to be used with standard trial case lenses. (Spheres.) According to this design, there will be no excess magnification in the axis meridian.

According to still another modification of my invention, I may modify the cylindrical excess magnification to make it proportional to the power of the respective cylinder, by formulating Conditions 12, 18 and 21, respectively, in such a manner that the values $S_{oc}T$, $S_{oc}TL_c$ and $S_{oc}T^1L_c$ become equal to $kV_{oc}$ or $k'V_{oc}L_s$, respectively, where $k$ and $k'$ are round number constants. A lens set of this type is given in Tables VIII.

Table VIII

Corrected trial set cylinders with excess magnification proportional to lens powers

$k = 0.5\%$ per diopter

DISTANT VISION

| Effective power diopters | Cylindrical excess magnification | $D_1$ diopters | $t$ mm. | $D_2$ diopters |
|---|---|---|---|---|
| | Percent | | | |
| +4.0 | 2.0 | +4.68 | 1.9 | −0.81 |
| +3.0 | 1.5 | +3.52 | 1.9 | −0.61 |
| +2.0 | 1.0 | +2.36 | 1.9 | −0.41 |
| +1.0 | 0.5 | +1.19 | 1.9 | −0.21 |
| −1.0 | −0.5 | −1.63 | 1.4 | +0.64 |
| −2.0 | −1.0 | −3.27 | 1.4 | +1.27 |
| −3.0 | −1.5 | −4.93 | 1.4 | +1.92 |
| −4.0 | −2.0 | −6.61 | 1.4 | +2.56 |

These are to be used with standard trial case lenses. (Spheres.)

NEAR VISION

| Effective power diopters | Cylindrical excess magnification | $D_1$ diopters | | $t$ mm. | $D_2$ diopters | |
|---|---|---|---|---|---|---|
| | | Axis meridian | Power meridian | | Axis meridian | Power meridian |
| | Percent | | | | | |
| +4.0 | +2.0 | −1.41 | +3.25 | 1.9 | +1.40 | +0.64 |
| +3.0 | +1.5 | −1.41 | +2.17 | 1.9 | +1.40 | +0.75 |
| +2.0 | +1.0 | −1.41 | +1.07 | 1.9 | +1.40 | +0.89 |
| +1.0 | +0.5 | −1.41 | −0.18 | 1.9 | +1.40 | +1.16 |
| −1.0 | −0.5 | −1.40 | −3.01 | 1.4 | +1.39 | +2.02 |
| −2.0 | −1.0 | −1.40 | −4.53 | 1.4 | +1.39 | +2.53 |
| −3.0 | −1.5 | −1.40 | −6.10 | 1.4 | +1.39 | +3.08 |
| −4.0 | −2.0 | −1.40 | −7.87 | 1.4 | +1.39 | +3.80 |

These are to be used with standard trial case lenses. (Spheres.) According to this design, there is no excess magnification in the axis meridian.

Figs. 6 and 7 also represent illustrations of the trial sets, according to Tables VI to VIII, if the values of these tables are applied to the dimensions indicated in these figures.

It will be evident that it is much more convenient to take into account a round excess magnification value equal for a group of trial lenses, or a magnification value which is conveniently proportional to the marked power of the respective lens, than to compensate for an irregular value different for each unit of the conventional trial set.

Although the above description refers only to combinations of cylindrical and spherical lenses, it is understood that the present inventive concept may be equally well applied to any lens combination, if it is desired to eliminate the spurious magnification introduced by the spacing of the lens elements. Accordingly, the herein described conditions will define combinations of lenses, spherical or cylindrical, if these conditions refer to a certain meridian which, in the case of a cylinder, would of course be the power or axis meridian. If so applied, the formulas given herein might be used with the subscripts used in Patent No. 2,131,232, namely, $f$ for the first lens and $s$ for the second lens. It will, for example, be evident that a combination of two spheres will be designed in accordance with the directions for computing the power meridians of a cylinder-sphere unit, and that, for example, in a combination of more than two lenses, each member can be corrected in accordance with the present disclosure by taking in account the different distance values.

It should be understood that the present disclosure is for the purpose of illustration only and that this invention includes all modifications and equivalents which fall within the scope of the appended claims.

I claim:

1. An optical system for testing dioptric defects at distant vision with two superimposed trial power lenses without introducing magnification effects due to the unequal spacing of said lenses from the eye to be tested, comprising means for holding before said eye two lens elements at a substantially fixed distance thereof for observation therethrough of a test object at substantially infinite distance, a back lens element having a certain power supported in said holding means next to the eye having in a certain meridian a reduced thickness $c_s$ and a curvature $D_3$ of its front surface and hence producing shape magnification $$S_{os} = \frac{1}{1 - D_3 c_s}$$

and a front lens element having a certain power and supported in said holding means at a distance $w$ of its back surface from said front surface, having in said meridian a reduced thickness $c_f$ and a curvature $D_1$ of its front surface and hence producing an excess shape magnification $$\frac{1}{1-D_1 c_f}$$

and having in said meridian a back surface with curvature $D_2$, said front lens therefore having a vertex power $V_{of} = S_{of} D_1 + D_2$ and hence effecting together with said back lens a separation magnification $$\frac{1}{1-V_{of}(w+S_{os}c_s)}$$

said curvatures being so shaped in relation to said thicknesses and said distances that said excess shape magnification becomes substantially a reciprocal of said separation magnification.

2. A system for testing dioptric defects of binocular vision, with two superimposed trial power lenses before one of the eyes and a single trial power lens before the other eye, without introducing magnification effects due to the unequal spacing of said lenses from their eye, comprising a test object; means for holding before each eye two lens elements at a substantially fixed distance thereof for observation therethrough of said test object at a distance $p$ from the eyes; a series of lenses having powers stepped in certain prescription power values and having in a certain meridian reduced thicknesses and curvatures effecting, with one of said lenses supported in said holding means before one of said eyes, a distance $u$ of its front surface from said object and effecting a certain shape magnification $S_{os}$ and hence a distance magnification factor $$\frac{S^2_{os}}{u+S_{os}}$$

and a second series of lenses having powers stepped in certain prescription power values and having reduced thicknesses $c_f$ and curvatures effecting, with one of said second series lenses supported in said holding means in front of and in alignment with a first series lens at a distance $w$ of adjacent surfaces of said lenses, a distance $u_f$ of the front surface of the front lens from said object and, with said thicknesses and distances, a certain vergence power $V_f$ and a certain shape magnification $S_{of}$, and any one of said first series lenses combined in said holding means with any one of said second series elements hence producing a combined excess magnification $$\frac{pS_{of}}{[1-V_f(w+S'_{os}c_s)](u_f+S_{of}c_f)}$$

said surfaces being so shaped in relation to said distances and said thicknesses that said distance magnification factor becomes substantially equal to said combined excess magnification.

3. A system for testing dioptric defects of binocular vision with two superimposed trial power lenses before one of the eyes and a single trial power lens before the other eye without introducing magnification effects due to the unequal spacing of said lenses from their eye, comprising a test object; means for holding before each eye two lens elements at a substantially fixed distance thereof for observation therethrough of said test object at a distance $p$ from the eyes; a lens element having a certain power supported in said holding means before one of said eyes at a distance $u$ of its front surface from said object, and having in a certain meridian a reduced thickness and curvatures effecting a certain shape magnification $S_{os}$, and hence a distance magnification factor $$\frac{S^2_{os}}{u+S_{os}}$$

and two lens elements having certain powers supported in said holding means before the other eye, and having in a meridian parallel to said certain meridian a distance $u_f$ of the front surface of the front element from said object, a distance $w$ of the adjacent surfaces of said elements, a reduced thickness $c_f$ of the front element and a reduced thickness $c_s$ of the back element, the surfaces of said front element producing in said meridian, with said thicknesses and distances, a certain vergence power $V_f$ and a certain shape magnification $S_{of}$, and the surfaces of said back element producing in said meridian, with said distances and thicknesses a certain shape magnification $S'_{os}$ and said front and said back element hence producing a combined excess magnification $$\frac{pS_{of}}{[1-V_f(w+S'_{os}c_s)](u_f+S_{of}c_f)}$$

said surfaces being so shaped in relation to said distances and said thicknesses that said distance magnification factor becomes substantially equal to said combined excess magnification.

4. A system for testing dioptric defects of binocular vision with two superimposed trial power lenses before one of the eyes and a single trial power lens before the other eye without introducing magnification effects due to the unequal spacing of said lenses from their eye, comprising a test object; means for holding before each eye two lens elements at a substantially fixed distance thereof for observation therethrough of said test object at a distance $p$ from the eyes; a lens element having a certain power supported in said holding means before one of said eyes at a distance $u$ of its front surface from said object, and having in a certain meridian a reduced thickness and curvatures effecting a certain shape magnification $S_{os}$, and hence a distance magnification factor $$\frac{S^2_{os}}{u+S_{os}}$$

and two lens elements having certain powers supported in said holding means before the other eye, and having in a meridian parallel to said certain meridian a distance $u_f$ of the front surface of the front element from said object, a distance $w$ of the adjacent surfaces of said elements, a reduced thickness $c_f$ of the front element and a reduced thickness $c_s$ of the back element, the surfaces of said front element producing in said meridian, with said thicknesses and distances, a certain vergence power $V_f$ and a certain shape magnification $S_{of}$, and the surfaces of said back element producing in said meridian, with said distances and thicknesses a certain shape magnification $S'_{os}$ and said front and said back element hence producing a combined excess magnification $$\frac{pS_{of}}{[1-V_f(w+S'_{os}c_s)](u_f+S_{of}c_f)}$$

said surfaces being so shaped in relation to said distances and said thicknesses that said distance magnification factor becomes substantially equal to a multiple of said combined excess magnification.

5. A system for testing dioptric defects of binocular vision with two superimposed trial power lenses before one of the eyes and a single trial power lens before the other eye without introducing magnification effects due to the unequal spacing of said lenses from their eye, comprising a test object; means for holding before each eye two lens elements at a substantially fixed distance thereof for observation therethrough of said test object at a distance $p$ from the eyes; a lens element having a certain power supported in said holding means before one of said eyes at a distance $u$ of its front surface from said object, and having in a certain meridian a reduced thickness and curvatures effecting a certain shape magnification; and two lens elements having certain powers supported in said holding means before the other eye, and having in a meridian parallel to said certain meridian a distance $u_f$ of the front surface of the front element from said object, a distance $w$ of the adjacent surfaces of said elements, a reduced thickness $c_f$ of the front element and a reduced thickness $c_s$ of the back element, the surfaces of said front element producing in said meridian, with said thicknesses and distances, a certain vergence power $V_f$ and a certain shape magnification $S_{of}$, and the surfaces of said back element producing in said meridian, with said distances and thicknesses a certain shape magnification $S'_{os}$ and said front and said back element hence producing a combined excess magnification $$\frac{pS_{of}}{[1-V_f(w+S'_{os}c_s)](u_f+S_{of}c_f)}$$

said surfaces being so shaped in relation to said distances and said thicknesses that said combined excess magnification becomes substantially equal to a multiple of said vergence power.

KENNETH N. OGLE.